(12) United States Patent
Cioffi et al.

(10) Patent No.: US 11,706,118 B2
(45) Date of Patent: Jul. 18, 2023

(54) METHODS AND APPARATUS FOR DETECTING INTERNET CONNECTION PROBLEMS

(71) Applicant: ASSIA SPE, LLC, Wilmington, DE (US)

(72) Inventors: John M. Cioffi, Atherton, CA (US); Christopher Fisher, San Ramon, CA (US); Philip Bednarz, Palo Alto, CA (US); Ardavan M. Tehrani, Atherton, CA (US); Tuncay Cil, San Francisco, CA (US); Lan Ke, Fremont, CA (US); Chan-Soo Hwang, Seoul (KR)

(73) Assignee: ASSIA SPE, LLC, Wilmington, DE (US)

( * ) Notice: Subject to any disclaimer, the term of this patent is extended or adjusted under 35 U.S.C. 154(b) by 0 days.

(21) Appl. No.: 17/157,875

(22) Filed: Jan. 25, 2021

(65) Prior Publication Data

US 2021/0152458 A1 May 20, 2021

Related U.S. Application Data

(63) Continuation of application No. 16/747,270, filed on Jan. 20, 2020, now Pat. No. 10,904,129, which is a
(Continued)

(51) Int. Cl.
*H04L 43/50* (2022.01)
*H04L 43/0894* (2022.01)
(Continued)

(52) U.S. Cl.
CPC .......... *H04L 43/50* (2013.01); *H04L 12/5692* (2013.01); *H04L 41/0677* (2013.01); *H04L 43/0894* (2013.01)

(58) Field of Classification Search
CPC . H04L 43/50; H04L 12/5692; H04L 41/0677; H04L 43/0894
See application file for complete search history.

(56) References Cited

U.S. PATENT DOCUMENTS

| 2003/0076852 | A1  | 4/2003 | Fukui |
| 2010/0142447 | A1* | 6/2010 | Schlicht ................. H04W 4/20 370/328 |

(Continued)

FOREIGN PATENT DOCUMENTS

| CN | 102027462 A | 4/2011 |
| CN | 102752170 A | 10/2012 |

(Continued)

OTHER PUBLICATIONS

European Search Report dated Oct. 13, 2021 in European patent application No. 21169857.6, (9 pgs).
(Continued)

*Primary Examiner* — Duc C Ho
(74) *Attorney, Agent, or Firm* — North Weber & Baugh LLP; Michael North

(57) ABSTRACT

A method of determining a problem with data packet transmission speed over a first communication medium coupled between a plurality of content servers and an ISP communication device. The method comprises repeatedly measuring the data packet transmission speed over the first communication medium coupled between each of the plurality of content servers and the ISP communication device, and determining there is a problem with the data packet transmission speed over the first communication medium coupled between one of the plurality of content servers and the ISP communication device when the repeatedly measured data packet transmission speeds over the first communication medium coupled between the one of the plurality of content servers and the ISP communication device is
(Continued)

substantially different from the repeatedly measured data packet transmission speeds over the first communication medium coupled between other of the plurality of content servers and the ISP communication device.

21 Claims, 4 Drawing Sheets

Related U.S. Application Data continuation of application No. 15/753,159, filed as application No. PCT/US2015/052044 on Sep. 24, 2015, now Pat. No. 10,567,266.

(51) Int. Cl.
*H04L 41/0677* (2022.01)
*H04L 12/54* (2022.01)

(56) References Cited

U.S. PATENT DOCUMENTS

| | | | | |
|---|---|---|---|---|
| 2010/0189096 | A1* | 7/2010 | Flynn | H04L 67/327 |
| | | | | 370/352 |
| 2010/0257281 | A1* | 10/2010 | Patel | H04L 12/4625 |
| | | | | 709/239 |
| 2011/0064043 | A1 | 5/2011 | Balachandran et al. | |
| 2013/0016696 | A1 | 1/2013 | Adjakple et al. | |
| 2013/0110988 | A1 | 5/2013 | Park et al. | |

FOREIGN PATENT DOCUMENTS

| | | |
|---|---|---|
| CN | 104937977 A | 9/2015 |
| CN | 103430482 A | 12/2020 |
| JP | 2004341576 A | 12/2004 |
| JP | 2005102180 A | 5/2005 |
| JP | 5477501 B1 | 4/2014 |
| JP | 2004228828 A | 8/2014 |
| JP | 2015026976 A | 1/2015 |

OTHER PUBLICATIONS

First Office Action dated Jun. 4, 2021, in Chinese patent application No. 201580083378.5, (14 pgs).
Patent certificate mailed Jun. 2, 2021, in European patent application No. 15904903.0, patent No. 3353953, (1 pg).
Response to the European office action filed May 30, 2022 in related European patent application No. 21169857.6, (24 pgs).
Korean office action dated Jul. 20, 2022 in related Korean patent application No. 10-2018-7008197, (12 pgs).
Korean office action dated Feb. 15, 2022 in Korean patent application No. 10-2018-7008197, (16 pgs).
Korean office action response filed Mar. 8, 2022 in Korean patent application No. 10-2018-7008197, (2 pgs).
Chinese notice of allowance dated Jan. 26, 2022 in Chinese patent application No. 201580083378.5, (4 pgs).
European notice of allowance dated Oct. 20, 2022 in related European patent application No. 21169857.6, (9 pgs).
Korean office action response filed Oct. 12, 2022 in related Korean patent application No. 10-2018-7008197, (2 pgs).
Korean office action dated Jan. 19, 2023 in related Korean patent application No. 10-2022-7044452, (21 pgs).
P. Kanuparthy et al., "DiffProbe: Detecting ISP service discrimination", 2010 Proc. IEEE Infocom, IEEE, pp. 1-9 (Mar. 2010), (9 pgs).
Korean office action response filed Mar. 16, 2023 in related Korean patent application No. 10-2022-7044452, (31 pgs).
European notice of loss of right, Rule 112(1)EPC dated Mar. 23, 2023 in related European patent application No. 21169857.6, (2 pgs).
European response to notice of loss of right filed May 25, 2023 in related European patent application No. 21169857.6, (4 pgs).

* cited by examiner

METHODS AND APPARATUS FOR DETECTING INTERNET CONNECTION PROBLEMS

CROSS-REFERENCE TO RELATED APPLICATIONS

This application is a continuation of and claims priority benefit to commonly-assigned U.S. patent application Ser. No. 16/747,270, now U.S. Pat. No. 10,904,129, entitled "METHODS AND APPARATUS FOR DETECTING INTERNET CONNECTION PROBLEMS," naming as inventors John M. Cioffi, Christopher Fisher, Philip Bednarz, Ardavan M. Tehrani, Tuncay Cil, Lan Ke, and Chan-Soo Hwang and filed on Jan. 20, 2020, which claims priority to U.S. Pat. No. 10,567,266, entitled "METHODS AND APPARATUS FOR DETECTING INTERNET CONNECTION PROBLEMS," naming as inventors John Cioffi, Christopher Fisher, Philip Bednarz, Ardavan M. Tehrani, Tuncay Cil, Lan Ke, and issued on Feb. 18, 2020, which is a 371 National Stage application of International Patent Application No. PCT/US15/052044, entitled "METHOD AND APPARATUS FOR DETECTING INTERNET CONNECTION PROBLEMS," naming as inventors John Cioffi, Christopher Fisher, Philip Bednarz, Ardavan M. Tehrani, Tuncay Cil, and Lan Ke, filed on Sep. 24, 2015. Each reference mentioned in this patent document is incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the present invention relates to detecting and diagnosing internet connection issues using measurements from multiple servers and multiple connection points to determine the location of a problem and impact of such.

BACKGROUND

Within the modern Internet economy various tools exist to help provide insight in to Internet connection performance. Generally speaking these tools are referred to as "speed tests." These tests provide a variety of performance metrics (ping, latency, jitter, etc.), the most referenced and ubiquitous being the upload and download speed of an Internet connection. It is thought that the tool most used by consumers is http://www.speedtest.net by Ookla/Ziff-Davis Publishing (http://www.ookla.com). Ookla provides a web browser based tool as well as variants of the tool for iOS, the mobile operating system available from Apple Inc., and Android smart phones/tablets. Ookla also offers a "cobranded" version of their tool, which is used by Internet service providers such as AT&T, Comcast and even the Federal Communications Commission (FCC) agency of the United States government (offered as a "mobile broadband measurement tool" called "FCC Speed Test" as part of the Measuring Broadband America initiative). In addition to Ookla's Speed Test product there are similar web browser tools (some having mobile iOS and/or Android extensions) including Testmy.net, Speedof.me, Myspeed.visualware.com, Bandwidthplace.com, and Ping-test.com.

The current landscape of speed test tools listed above allows users to test a single device connection (a Personal Computer (PC)/laptop, Apple iPhone/iPad, Android smart phone/tablet) to a nearest geographical test server node typically within a user's Internet service provider. These tools primarily report a single upload and download speed and some of the tools also provide comparative metrics for alternate service providers, speeds of alternate users within a similar geography, at similar times, etc., all of which attempt to help the user understand how their results compare to others and other networks.

BRIEF DESCRIPTION OF THE DRAWINGS

Embodiments are illustrated by way of example, and not by way of limitation, and can be more fully understood with reference to the following detailed description when considered in connection with the figures in which.

DETAILED DESCRIPTION

Embodiments of the invention inform an internet user where is the "bottle neck"/slowest link in their connection and then, where possible, offer the user a "fix"/improvement. The conventional, prior art, speed test metrics, while marginally useful, do not tell the user specifically what is going on with the individual segments of their internet connection nor are they related to connectivity elements beyond the internet service provider network, e.g., peering networks, Content Delivery Networks (CDNs), etc., all of which are relevant to a user experience that is highly contextual.

Embodiments of the invention provide the user with three speed measurements:

Download speed from a relevant (defined by the user inputting a specific URL) content site;

Broadband/fixed line speed (upload and download to multiple out-of-the internet service provider network test servers in any geographic location); and Wireless speed (e.g., Wi-Fi or mobile 3G/4G/LTE depending upon the physical connection from the user's device to the internet during the speed test session).

By having each of these three relevant measurements the user can now assess which of the connection segments is slowest and thus acting as the "bottle neck" in their connectivity experience.

In addition to these test results, embodiments of the invention also offer the user monitoring and optimization services for all types of Digital Subscriber Lines (xDSL), local area wireless computer networking technology such as Wi-Fi, and mobile WiFi/3G/4G/LTE connections. In those situations where throughput performance can be improved and when embodiments of the invention are present the user may opt in to monitoring/optimization services that from "the cloud" continuously monitors the user's home Wi-Fi router, xDSL and/or mobile Wi-Fi/3G/4G/LTE connection and continuously optimizes to insure maximal connectivity performance.

Results of a broadband test in accordance with embodiments of the invention combined with content test results can be used to infer service provider net neutrality violations. Users that install and use embodiments of the invention can accumulate a statistical database of test results over time, geography, content provider, and service provider, and derive reports therefrom that indicate either network traffic congestion issues or active service provider throttling and, hence, net neutrality violations. The aforementioned subjects will be discussed further relative to FIG. 1 and FIG. 2.

Figure 3:
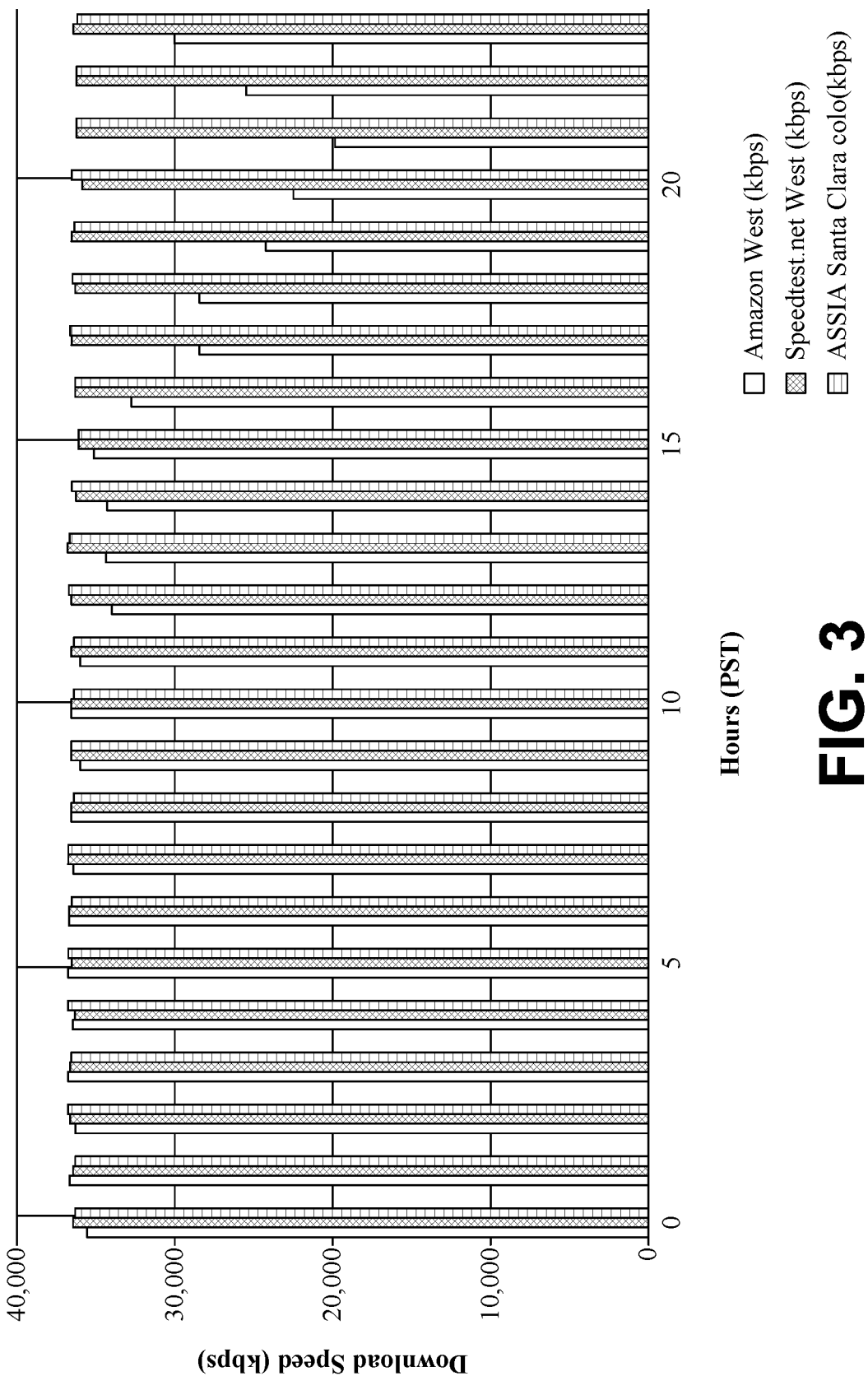
FIG. 3 is a graphical illustration of one embodiment of network neutrality reporting and analysis.

As an example of the network neutrality reporting and analysis that embodiments of the invention can measure and report, FIG. 3 relates to a user in the San Francisco Bay Area. This user ran tests every hour on the hour for a period of 14 days. The download speed data depicted in FIG. 3 shows the average (over 14 days) test results of the broadband measurement connected to a test node server in Santa Clara, Calif., operated by the assignee of the invention, ASSIA, Inc., in accordance with an embodiment of the invention, the content measurement to the www.amazon.com west coast CDN, and a comparative measurement using Ookla's speedtest.net tool. The service provider in this example is tested between the hours of 5 PM and 1 PM PT, and, speed performance rapidly diminishes and by as much as 40 percent at 9 PM PT.

Figure 4:
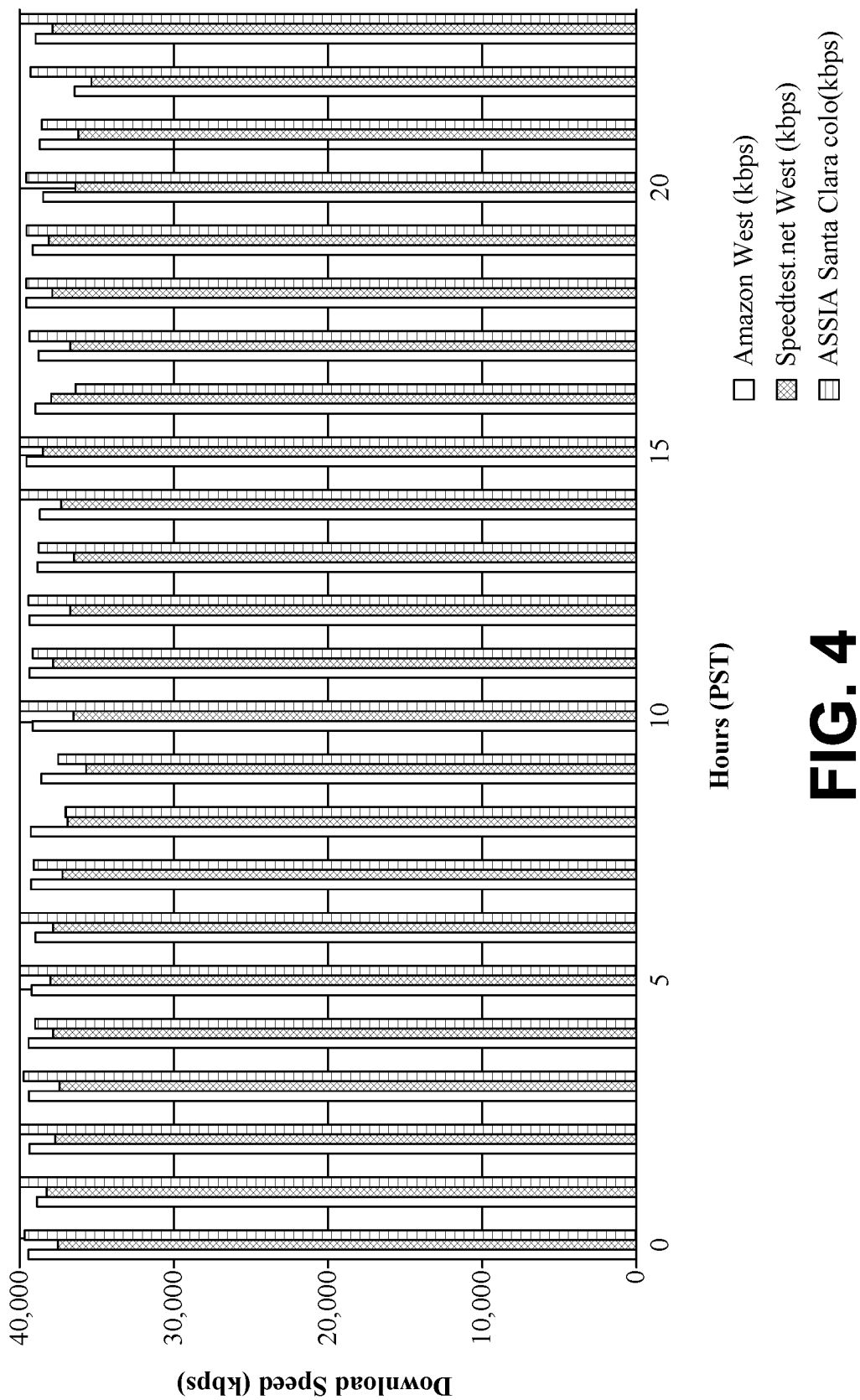
FIG. 4 is another graphical illustration of an embodiment of network neutrality reporting and analysis.

The same test was performed by another user in the same location and over the same time period, but connected to a different service provider. The results are shown in FIG. 4.

The results depicted in these two tables suggest that the first service provider may have been actively throttling traffic from www.amazon.com to San Francisco Bay Area subscribers during the hours of 5 PM to 1 IPM PT while the second service provider was not.

Embodiments of the invention provide much more than conventional "speed test" utilities. In the hands of a trusted third party utility with no motivation to obfuscate or mislead consumers, embodiments of the invention provide a tool and service to measure, monitor, improve and report to consumers and other interested parties on the performance of their internet connectivity experience and ascertain where is the "bottle neck." Additionally, with sufficient user test data, embodiments can help determine if service providers are actively throttling an internet subscriber's connectivity experience.

Figure 1:
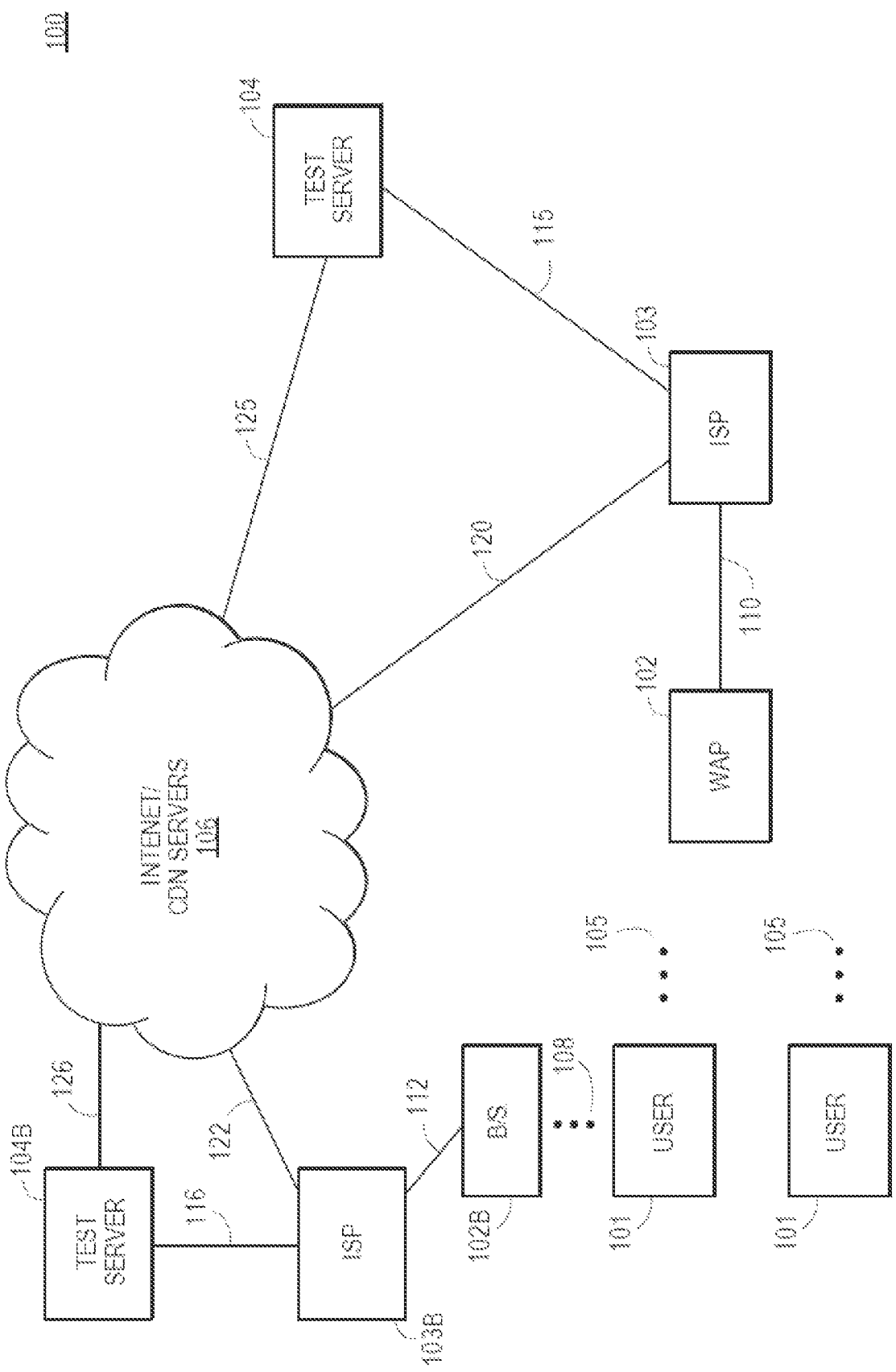
FIG. 1 illustrates an environment in which an embodiment of the invention operates.
Figure 2:
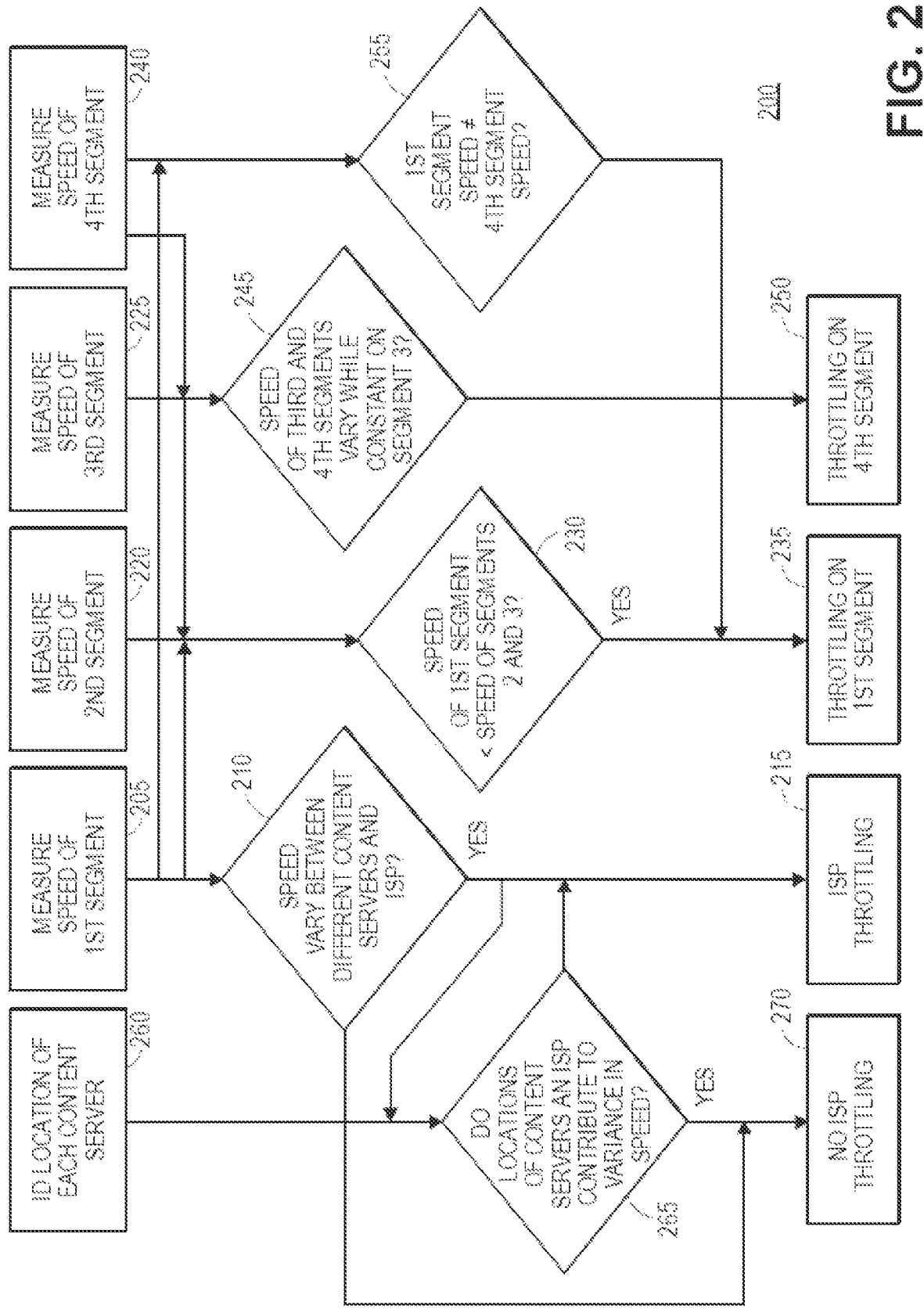
FIG. 2 is a flowchart depicting method steps for embodiments of the invention.

FIG. 1 illustrates an internetwork 100 in which embodiments of the invention may operate. The access portion of the internet connection appears in the link segments labeled 105 and 110, and link segments labeled 108 and 112. Link segment 105, or simply, segment 105 has an associated data transmission speed between the wireless access point 102 and an end user device 101 like a smartphone or tablet (or laptop, Internet Protocol Television (IPTV), etc.). Likewise, link segment 108 has an associated data transmission speed between the base station 102B and an end user device 101. Embodiments of the invention measure the data transmission speed, or simply, speed, of segment 105, typically reported as the Wi-Fi speed (or cellular speed, in the case of segment 108).

It is appreciated that device 101 may be any "thing" in the so-called "Internet of Things", a network of physical objects or "things" embedded with electronics, software, sensors and connectivity to enable it to exchange data with a manufacturer, operator and/or other connected devices within the existing Internet infrastructure. As examples, "things" include a wide variety of devices such as implants and/or biochip transponders in humans or farm animals, automobiles with built-in sensors, or devices in the field that assist emergency services personnel. These devices collect data using various existing technologies and then autonomously transfer the data between other devices. Current residential market examples include smart thermostat systems and washer/dryers that utilize Wi-Fi for remote monitoring.

An internet access device (IAD), such as wireless access point 102 can be either of the user (an internet service provider consumer's residential Wi-Fi access point), or a Wi-Fi hotspot. Alternatively, the IAD may be a mobile 3G/4G/LTE base station 102B. Segment 105 can also be a fixed Ethernet connection to the residential Customer Premises Equipment (CPE)/broadband modem. The speed of data transmission over segment 105 may be referred to as "Wi-Fi speed", and the speed of data transmission over segment 108 may be referred to as "cellular speed." In alternative embodiments, a variety of devices within the home (or local area network) may communicate over segment 105 via ZigBee (a lower power RF radio-based personal area network based on the IEEE 802.15.4 standard), Zwave (a wireless communications protocol designed for home automation, specifically for remote control applications in residential and light commercial environments, that uses a low-power RF radio embedded or retrofitted into electronic devices and systems, such as lighting, access controls, entertainment systems and household appliances), Bluetooth, or other inside the home distribution systems, such as power line or G now/G.hn. G now is a broadband access platform available from Marvell Technology Group Ltd. based on G.hn technology, a family of ITU-T Recommendations (G.996x) defining home networking over phone lines, power lines and coaxial cables. G now systems use standard G.hn chips and apply system-level software enhancements to deliver an access solution over phone lines or coaxial cabling.

Segment 110 is typically a fixed-line connection between the wireless access point 102 (sometimes also called the gateway) and the Internet Service Provider's (ISP's) network, starting at ISP communication device 103. Such a segment can use fiber, coaxial cable, or copper phone line or combinations of these media to connect the access point to an ISP's network at 103. Embodiments of the invention also measure the data transmission speed of segment 110. Likewise, segment 108 is typically a fixed-line connection between the base station 102B and the Internet Service Provider's (ISP's) network, starting at ISP communication device 103B. Such a segment can use fiber, coaxial cable, or copper phone line or combinations of these media to connect the access point to an ISP's network at 103B. Embodiments of the invention also measure the data transmission speed of segment 108. While the embodiment illustrated in FIG. 1 shows two separate ISP devices 103 and 103B, in an alternative embodiment, base station 102B and WAP 102 may both connect to the same ISP device over the same or a separate link.

In some cases, devices/software agents operating in accordance with embodiments of the invention that are present in the network at various points (e.g., gateways, Digital Subscriber Line Access Multiplexers (DSLAMs), Optical Line Terminals (OLTs)) allow just the fixed-line physical media speed over segments 108 and 110 to be measured. In other cases, when software agents are not present at such points, the speed over the combination of segments 110 and 115, or 108 and 112, is measured. The speed over these combination of segments is referred to herein as the "broadband-speed" in a report to the consumer, and is most commonly measured (whether or not the speed of segment 108 or 110 is independently recorded). By way of comparison, prior art tools, such as the Ookla Speedtest, only report the speed measurement for the combined segments 105, 110 and 115, or for the combined segments 108, 112 and 116, to an Ookla server.

Embodiments of the invention also measure the speed to/between other servers and appropriately enabled application servers 106 throughout the internet. One of these measured speeds is reported to the consumer and known as the "content speed" and corresponds to the combined segments 110 and 120, or combined segments 112 and 122 in FIG. 1. The consumer can program the content server (for instance, enter http://www.youtube.com for a speed test of YouTube, in one embodiment). One embodiment also measures the speed of segment 125 from a test server 104, or the speed of segment 126 from test server 104B, enabled according to embodiments of the invention, to a content server 106, which can be useful in various diagnostics.

While the embodiments of the invention mentioned thus far contemplate a client-server architecture, with a client or end-user device, such as user device 101, communicating with a server, whether an application server or content server or other type of server, embodiments of the invention may also involve a peer-to-peer network, or at least measure speeds over segments between peer devices. For example, embodiments may measure speeds over segments (not shown) between user devices 101.

In embodiments of the invention, various segments such as segments 112, 115, 120, 122, 125, and 126 may each include one or more bonded channels. For example, multiple DSL lines can be bonded to provide higher bandwidth. Channel bonding as used herein contemplates channel bonding between physical interfaces, either per packet (OSI model Layer 3) or a data link (OSI model Layer 2) basis, as well as broadband bonding, an aggregation of multiple channels at OSI layers 4 and higher. Channels bonded can be wired links such as a DSL line or cellular links for an aggregated wireless bonded link. In such embodiments, not only the speed of the aggregated links may be measured, but also the speed of the individual links that comprise the aggregated link. This latter information may then be used, for example, to determine the best path for routing data traffic, or to provide a network map for local, in-home and/or nomadic roaming via Wi-Fi, or on/off 3G/4G, and 5 G cellular communications.

Embodiment may measure server speeds over segments 110 and 115 for several test servers 104, or over segments 112 and 116 for test servers 104B, and also measure server speeds over segments 110 and 120, or over segments 112 and 122, for various content servers 106. Some or all of these speeds may not be reported to the consumer directly. However, they can be used to infer the bottlenecked internet connection as described below.

Embodiments of the invention were born from a desire to measure each segment of a consumer's internet connectivity experience from the consumer's device to the content network at any given time and ascertain where the "bottle neck" is in the connection. In this context, various embodiments take in to account the need to not just provide a "speed test" as described above but to measure each of the component parts of a connectivity experience and report the consumer results so as to answer the question, "where is the bottle neck in my connection?"

For instance if segment 105 is the lowest speed reported, then the local connection, e.g., Wi-Fi is the limiting factor. The speed of segment 105 is measured and reported for all devices on the same access point 102. If, instead segment 110 is reported as the lowest speed, it is that fixed-line 110 that is limiting. If the combined segments 110 and 115 report the lowest speed, then the connection from the gateway 102 back to test server 104 is limiting, which may be attributable to the fixed-line speed 110 or it could be in the routing network of the ISP to the test server 104. The speed of fixed-line 110 may be identified as the likely bottleneck if all the speed measurements over combined segments 110 and 115 are about the same low value. However, if the measurements of speed over combined segments 110 and 115 are consistently different over time, it suggest that the ISP's network is throttling or experiencing difficulty to one a plurality of test servers 104.

Likewise, if segment 108 is the lowest speed reported, then the local connection, e.g., the cellular mobile communication link between end user devices 101 and base station 102B, is the limiting factor. The speed of segment 108 is measured and reported for all devices on the same base station 102B. If, instead segment 112 is reported as the lowest speed, it is that fixed-line that is limiting. If the combined segments 112 and 116 report the lowest speed, then the connection from the base station 102B back to test server 104B is limiting, which may be attributable to the fixed-line speed 112 or it could be in the routing network of the ISP to the test server 104B. The speed of fixed-line 112 may be identified as the likely bottleneck if all the speed measurements over combined segments 112 and 116 are about the same low value. However, if the measurements of speed over combined segments 112 and 116 are consistently different over time, it suggest that the ISP's network is throttling or experiencing difficulty to one a plurality of test servers 104B.

Embodiments of the invention provide statistical algorithms that take many speed measurements at different points in the internetwork 100 over time and develop an increasing confidence as to which network segment (if any) may be limiting connectivity the most. This segment (or multiple segments if all are sometimes limiting) could be marked for corrective action such as dynamic optimization or perhaps some other type of equipment replacement or connection improvement.

Similarly, speed measurements over the combination of segments 110 and 120, or the combination of segments 112 and 122, which consistently show one application server 106 getting better performance than another implies the ISP is throttling one of the applications in its network. Embodiments of the invention can detect the location of the servers 106, and also of test servers 104/104B, so simple geographical distance can be used (or eliminated as a cause) of the throttling. The speed measurement over segment 125 or segment 126 can also be used to infer that a consumer may be throttled to a server 106, where the test server 104/104B was not throttled. As set forth in the claims that follow, and with reference to the flowchart 200 in FIG. 2, embodiments of the invention provide for a method of determining an internetwork service provider communication device (ISP) is throttling data packet transmission speed over a first segment 120 coupled between a plurality of content servers 106 and the ISP device 103, the method involving at 205 repeatedly measuring a data packet transmission speed over a first segment 120 coupled between each of the plurality of content servers and the ISP, and determining at 215 that the ISP is throttling the data packet transmission speed over first segment 120 coupled between one of the plurality of content servers and the ISP when the repeatedly measured data packet. Transmission speeds over first segment 120 coupled between the one of the plurality of content servers and the ISP is found at 210 to be substantially different from the repeatedly measured data packet transmission speeds over first segment 120 coupled between other of the plurality of content servers and the ISP.

In the above embodiment, wherein a second segment 125 is coupled between a speed testing server 104 and the plurality of content servers 106, and a third segment 115 is coupled between a speed testing server 104 and the ISP, the method may further comprise repeatedly measuring at 220 the data packet transmission speed over the second segment 125 coupled between the speed testing server and the plurality of content servers, repeatedly measuring at 225 data packet transmission speed over third segment 115 coupled between the speed testing server and the ISP, comparing the repeatedly measured data packet transmission speeds over first segment 120 coupled between each of the plurality of content servers and the ISP at 205 to the repeatedly measured data packet transmission speeds over a combination of third segment 115 and second segment 125, and determining at 235 that throttling of data packet transmission speed over first segment 120 coupled between one of the plurality of content servers and the ISP is occurring when the repeatedly measured data packet transmission speeds over first segment 120 coupled between one of the plurality of content servers and the ISP is found at 230 to be substantially slower than the data packet transmission speeds over the combination of second and third segments 125 and 115 coupled between the one of the plurality of content servers and the ISP.

In the above embodiment, a fourth segment 110, utilizing fiber, coaxial cable, or twisted pair copper phone line, is coupled between the ISP device 103 and an internetwork access device 102, e.g., Wi-Fi access point, cellular/mobile base station, gateway, or CPE/broadband modem. The embodiment may further comprise repeatedly measuring at 240 the data packet transmission speed over the fourth segment 110 coupled between the internetwork access device (IAD) 102 and the ISP device 103, determining at 250 throttling of data packet transmission speed over fourth segment 110 coupled between the ISP and the IAD when it is found that the repeatedly measured data packet transmission speeds over the combination of the fourth segment 110 and third segment 115 vary over a period of time while the repeatedly measured data packet transmission speeds for the third segment 115 coupled between the speed testing server 104 and the ISP device 103 remain substantially the same over substantially the same period of time.

The above embodiment may further comprise determining at 255 that first segment 120 is a bottleneck (235) when the repeatedly measured data packet transmission speed over the first segment 120 versus the measured data packet transmission speed over the fourth segment 110 is substantially different over substantially the same period of time.

One embodiment involves identifying at 260 a geographic location of each of the one or more content servers 106 and the ISP device 103, and wherein determining the ISP is throttling the data packet transmission speeds over segment 120 between the one of the plurality of content servers and the ISP at 215, as described above, comprises evaluating at 265 the extent to which the geographic location of the one of the plurality of content servers relative to the respective geographic location of the other of the plurality of content servers with respect to the geographic location of the ISP contributes to the substantially different data packet transmission speed over segment 120 between the one of the plurality of content servers and the ISP compared to the data packet transmission speeds over segment 120 coupled between other of the plurality of content servers and the ISP. If the geographic location of the one of the plurality of content servers relative to the respective geographic location of the other of the plurality of content servers with respect to the geographic location of the ISP does contribute to the substantially different data packet transmission speed over segment 120 between the one of the plurality of content servers and the ISP compared to the data packet transmission speeds over segment 120 coupled between other of the plurality of content servers and the ISP, then it is determined at 270 that no ISP throttling is occurring. Conversely, if the geographic location of the one of the plurality of content servers relative to the respective geographic location of the other of the plurality of content servers with respect to the geographic location of the ISP does not contribute to the substantially different data packet transmission speed over segment 120 between the one of the plurality of content servers and the ISP compared to the data packet transmission speeds over segment 120 coupled between other of the plurality of content servers and the ISP, then it is determined at 215 that ISP throttling is occurring.

One embodiment may further comprise identifying and selecting a flow of data packets exchanged with an end user device 101, or application executing thereon, coupled in communication with the ISP device 103, from among the data packets transmitted over segment 120 between each of the plurality of content servers 106 and the ISP device 103, wherein repeatedly measuring the data packet transmission speed over segment 120 coupled between each of the plurality of content servers and the ISP comprises repeatedly measuring the data packet transmission speed of the selected flow of data packets exchanged with the end user device, and wherein determining the ISP is throttling the data packet transmission speed over segment 120 comprises determining the ISP is throttling the data packet transmission speed over segment 120 when the repeatedly measured data packet transmission speed of the selected flow of data packets is substantially different from the data packet transmission speeds over segment 120 between the plurality of content servers and the ISP. This embodiment may further comprise receiving input at the end user device 101 to identify and select the flow of data packets exchanged with the end user device, or exchanged with a software application executing on the end user device.

One embodiment of the invention further comprises one or both of optimizing noise cancellation and automatically re-profiling another communication medium coupling an internetwork access device 102 and the ISP device 103 responsive to determining the ISP is throttling the data packet transmission speed over segment 120 coupled between one of the plurality of content servers and the ISP's communication medium to the device 102. This embodiment may further comprise optimizing a new communication medium 105 coupling one or more end user devices 101 and the internetwork access device 102. In this embodiment of the invention, speed measurements can be mapped to a profile that has been adaptively set by a profile optimizer for a Wi-Fi connection, DSL link, or other type of media segment. The optimizer determines an appropriate balance between line speed and line instability that can impact line performance, for example, radio transmissions, weather, usage patterns, near-by appliances and neighborhood construction. One such product, DSL Expresse Profile Optimizer (PO), available from the assignee of embodiments of the invention, helps service providers define and proactively enforce business logic across a network automatically, regardless of hardware platform, and optimize this balance. A profile optimizer uses collected data to determine if a line is performing according to customized business rules (for instance, speed range, stability, and service quality requirements) as defined by the service provider. It then automatically adjusts line parameters to ensure these rules are met.

In another embodiment, user devices 101 may be connected to an internetwork access device, such as mobile base station 102B, via wireless (cellular communication) link 108, and/or connected to a wireless access point 102 via wireless (WiFi) link 105. The mobile base station 102B is connected via wired link 112 to the cloud/internet via ISP communication device 103B. Depending on the embodiment, ISP communication device 103 and ISP communication device 103B may be the same or separate ISP communication devices. In one embodiment, the speed tests described above with regard to FIG. 2 could be performed on either or both links, one test being performed via WAP 102, and the other test being performed via mobile base station 102B. The information from user devices 101 is collected, both for the broadband service connection via WAP 102 and for the mobile service connection via mobile BS 102B. This information may also be saved, e.g., stored in a database or on a data server, and/or locally or remotely on a management server.

In particular, when a user device 101 experiences a problem with a connection, the collected information may be processed, analyzed, and used in remedying the problem. In one embodiment, a plurality of users could be online at the same time. In most indoor environments, the user devices may be using WAP 102 and WiFi link 105 as the Primary choice for connection to the internet, with mobile BS 102B and cellular communications link 108 as the secondary choice for connection to the internet. In one embodiment, the number of user devices using WiFi may be large, or the amount of data being transmitted and/or received by the plurality of user devices may be large, such that either exceeds the number of WiFi connections or causes WiFi connection issues. In such a situation, the information collected from the user devices can be analyzed and used to relieve the load on the WiFi access point 102 by having one or more user devices connect to the internet via their respective mobile connections over link 108. For example, if a user device's broadband connection via link 105 operates at a speed that is lower than the speed of the same user's mobile connection via link 108, then that user device could be switched to a mobile connection for access to the internet.

A management system, either remote or local, may store the collected connection information, analyze it, and either through the input of the users, or through observing the quality of the links 105 and 108, determine how to allocate and/or distribute the connections between broadband- and mobile-connection services. In one embodiment, such a management system may have logical connections to the user devices, as well as to the mobile BS 102B and WAP 102, via which it could collect data regarding the connections.

The above allocations for the WiFi connection present a non-linear access problem, given that WiFi use multi-access protocols, which are random access protocols. In particular, WiFi operates according to IEEE std 802.11a/b/g/n/ac, which employs Carrier Sense Multiple Access with Collision Avoidance (CSMA/CA). According to CSMA/CA, each WiFi device (e.g., station or access point) senses the radio band, and if there are no other devices accessing the radio band, transmits data. All transmissions, however, are acknowledged by a receiving party, so if there is no acknowledgement received by the transmitting device, it assumes there was a collision, and in such case, backs off transmission for a random period of time before attempting to transmit data again. This non-linear scheme means than WiFi devices can transmit and/or receive data at any point in time. In one embodiment of the invention, in order to reduce the complexity of such allocations, a number of steps and a number of criteria are proposed.

Firstly, in an indoor environment, the WiFi or broadband connection is given priority over the mobile connection. There are a variety of reasons for such criteria, such as the mobile connection typically being less reliable and more expensive than the WiFi or broadband connection. Further, if a user device does not have a mobile connection capability, such device would be assigned first to the WiFi connection.

Furthermore, if a user device requires a connection with a high data rate, such a device is assigned to the WiFi connection first. Connections for user devices may be ordered based on data rate requirements: connections with higher data rate requirements are assigned first, and then connections with lower data rate requirements are assigned.

In summary, the following steps are taken, in accordance with an embodiment of the invention. It should be noted that the steps need not be taken in the order presented below, and not all steps are required.

1. All user devices are categorized as having, or not, mobile connectivity. The devices without mobile capability may only be assigned to the broadband connection via WAP 102.
2. The devices are ordered based on data speed/throughput requirements. The data speed/throughput requirements information may be collected by observing the speed/throughput at which a connection is operating. The embodiments of the invention previously discussed provide such information.
3. The devices may be given priority or weighting. A user, or administrator, or management system may determine such. For example, a user device may have a latency requirement based on certain applications it is executing (e.g., gaming, etc.) and is, therefore, given higher priority than another user device that might have a higher speed/throughput requirement. This requirement could overwrite the previous ordering criteria for one or more user devices.
4. If a user device's broadband connection 105 has a speed lower than the speed for the same user's mobile connection 108, then the user device could be switched to the mobile connection.
5. Finally, based on the above, user devices with higher priority, or higher order, or without mobile capability, are assigned to the WiFi connection. The remaining user devices are assigned to the WiFi connection if enough capacity is available, otherwise they are switched to a mobile connection.

In another embodiment, the mobile connection is used for diagnostic purposes when the broadband connection has a problem. In many cases, a link failure of one of the segments, such as segment 105 or segment 110, is more likely than the other connections. In such a case, a speed test on the links will not be feasible. For example, if the link 110 to the ISP communications device 103 is broken, or has connection issues, then the end user device 101 cannot find out whether the connection problem is caused by a problem with link 105 or link 110. In such embodiment, only a link management entity or an agent on the WAP 102 could identify the connection problem as being either link 110 or link 105. However, if the connection to the end user device 101 is broken, such information could not be communicated directly to end user device 101. In such case, the alternative connection via the mobile BS 102B to device 101 may be used to communicate such information. In one embodiment, a management entity or a server is communicatively connected to WAP 102, and to end user device 101, via the cloud/internet, and from which it collects information about the WAP and its connections. The management entity or server can also share the information with the end user device 101, via the internet, and through the connections 108, 112, and 122. Alternatively, an agent could be present on the WAP 102, via which the end user device 101 can directly communicate and collect information. If the connection problem is due to link 110, then the user or subscriber associated with or using end user device 101 at such times needs to contact a service provider to get the problem fixed. However, if link 105 is the problem, then the user might be able to fix the problem by relocating, or connecting via another end user device, etc. In either case, the knowledge of the cause of the connection problem expedites finding the proper remedy.

In cases where the connection problem is caused by link 110 (which means the broadband connection has a problem), the management entity cannot communicate with WAP 102. Therefore, the management entity may conclude that the connection problem is with the broadband connection. In such case, the management entity could potentially communicate with the WAP 102, via the user device 101, through mobile connection 108. However, if the connection problem is with link 105, and not with link 110, the management entity may communicate with WAP 102, conclude that the connection problem is with link 105, and pass on a message indicating such to a user device 101 via mobile link 108. Furthermore, in such case, the management entity could also verify the problem, as attempts to communicate with WAP 102 via the user device 101 through the mobile connection 108 would fail.

Embodiments of the invention may be implemented on one or more general purpose or special purpose computer systems, within which a set of instructions, for causing the aforesaid devices to perform any one or more of the methodologies discussed herein, may be executed. In alternative embodiments, these devices may be connected, networked, interfaced, etc., with other machines in a Local Area Network (LAN), a Wide Area Network, an intranet, an extranet, or the Internet. One or more of the devices may operate in the capacity of a server or a client in a client-server network environment, or as a peer in a peer-to-peer (or distributed) network environment. In certain embodiments, each of the devices may be in the form of a personal computer (PC), a tablet PC, a set-top box (STB), a Personal Digital Assistant (PDA), a cellular telephone, a web appliance, a server, a network router, switch or bridge, computing system, Internet enabled television, or any machine capable of executing a set of instructions (sequential or otherwise) that specify actions to be taken by that machine. Further, where only a single machine is illustrated, the term "machine" shall also be taken to include any collection of machines (e.g., computers) that individually or jointly execute a set (or multiple sets) of instructions to perform any one or more of the methodologies discussed herein.

One or more of the devices may include a non-transitory machine-readable storage medium (or more specifically a non-transitory machine-accessible storage medium) on which is stored one or more sets of instructions (e.g., software) embodying any one or more of the methodologies or functions described herein. Software may also reside, or alternatively reside within a main memory of a device, and may further reside completely or at least partially within a processor(s) during execution thereof by a computing system, the main memory and the processor(s) also constituting machine-readable storage media. The software may further be transmitted or received over a network via a network interface card.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method of identifying, by a network management entity, a preferred network path, the method comprising:
categorizing a first user device based on a capability to support mobile connectivity and/or broadband connectivity;
performing a plurality of network measurements across a plurality of network segments in the network, the plurality of network segments coupled to the first user device, the plurality of network segments comprising at least one mobile segment and at least one broadband segment; and
analyzing the user device categorization and the plurality of network measurements to identify the preferred network path in the network for the first user device.

2. The method of claim 1 further comprising the step of prioritizing the first user device relative to at least one other user device based on service requirements and wherein the step of analyzing the user device categorization and the plurality of network measurements further comprises analyzing the first user device prioritization.

3. The method of claim 1 wherein at least one test server performs a first subset of network measurements within the plurality of network measurements across a first subset of network segments.

4. The method of claim 3 wherein the first subset of network segments is broadband segments.

5. The method of claim 3 wherein the first subset of network segments is mobile segments.

6. The method of claim 1 wherein the plurality of network measurements comprises network data rate tests.

7. The method of claim 6 wherein a bottleneck condition is identified within the network based on the plurality of network measurements.

8. The method of claim 1 wherein the preferred network path comprises at least two network segments within the plurality of network segments.

9. The method of claim 1 wherein the plurality of network measurements comprises a network failure detection.

10. The method of claim 9 wherein the preferred network path relates to a path type that is different from a failed path associated with the failure detection.

11. The method of claim 1 wherein the plurality of network measurements is stored within a storage device and averaged over a period of time.

12. The method of claim 1 wherein the step of analyzing the user device categorization and the plurality of network measurements is performed by a network management entity.

13. A network management entity for managing a broadband and mobile network, the network management entity comprising:
   a broadband segment measurement agent that receives at least one broadband measurement across at least one broadband segment coupled to a user device;
   a mobile segment measurement agent that receives at least one mobile segment measurement across at least one mobile segment coupled to the user device; and
   a diagnostic engine coupled to the broadband segment measurement agent and the mobile segment measurement agent, the diagnostic engine receives the at least one broadband segment measurement and the at least one mobile segment measurement and generates a preferred network path for the user device between a mobile network path and a broadband network path.

14. The network management entity of claim 13 wherein the at least one broadband segment measurement relates to a data rate on at least one broadband segment coupled to the user device.

15. The network management entity of claim 13 wherein the at least one mobile segment measurement relates to a data rate on the at least one mobile segment coupled to the user device.

16. The network management entity of claim 13 wherein the at least one broadband segment measurement or the at least one mobile segment measurement relates to a link failure in the at least one broadband segment or the at least one mobile segment.

17. A method to determine, by a network management entity, a preferred network path for an application on a user device, the method comprising:
   categorizing a user device based on a capability to support mobile connectivity and/or broadband connectivity;
   identifying an application operating on the user device;
   performing a plurality of network measurements across a plurality of network segments in the network, the plurality of network segments coupled to the user device, the plurality of network segments comprising at least one mobile segment and at least one broadband segment; and
   analyzing the user device categorization, the application and the plurality of network measurements to identify the preferred network path in the network for the application on the user device.

18. The method of claim 17 further comprising the step of prioritizing the first user device relative to at least one other user device based on service requirements and wherein the step of analyzing the user device categorization, the application and the plurality of network measurements further comprises analyzing the first user device prioritization.

19. The method of claim 17 wherein at least one test server performs a first subset of network measurements within the plurality of network measurements across a first subset of network segments.

20. The method of claim 19 wherein the first subset of network segments is broadband segments.

21. The method of claim 19 wherein the first subset of network segments is mobile segments.

* * * * *